(12) United States Patent
Furey et al.

(10) Patent No.: US 8,109,284 B2
(45) Date of Patent: Feb. 7, 2012

(54) BUBBLE TRAP ASSEMBLY FOR CRITICAL BIOPROCESS APPLICATIONS

(75) Inventors: James F. Furey, Plainsboro, NJ (US); John F. McMickle, Jr., Nazareth, PA (US)

(73) Assignee: PendoTECH, Plainsboro, NJ (US)

( * ) Notice: Subject to any disclaimer, the term of this patent is extended or adjusted under 35 U.S.C. 154(b) by 584 days.

(21) Appl. No.: 12/239,667

(22) Filed: Sep. 26, 2008

(65) Prior Publication Data
US 2009/0084267 A1   Apr. 2, 2009

Related U.S. Application Data

(60) Provisional application No. 60/995,951, filed on Sep. 29, 2007.

(51) Int. Cl.
*F24D 19/08* (2006.01)
(52) U.S. Cl. ............ 137/197; 137/583; 220/495.06
(58) Field of Classification Search .......... 137/375, 137/171, 197, 583; 220/495.01, 495.06
See application file for complete search history.

(56) References Cited

U.S. PATENT DOCUMENTS

| 3,724,491 | A | * | 4/1973 | Knudsen et al. ............. 137/375 |
| 5,158,114 | A | * | 10/1992 | Botsolas ................... 138/149 |

* cited by examiner

*Primary Examiner* — Craig Schneider
(74) *Attorney, Agent, or Firm* — Hoffmann & Baron, LLP

(57) ABSTRACT

A bubble trap assembly for critical bioprocess applications. The assembly includes a disposable liner including a gas port disposed on a top of the liner, and two fluid ports disposed on the bottom of the liner. The fluid ports coupled in-line to the critical bioprocess application. A rigid vessel is included for housing the liner. The liner being sized to substantially conform to a shape of the inside of the vessel. The vessel includes an upper aperture for aligning with the gas port and a bottom opening opposed to the upper aperture. A bottom cap is included, removeably secured to the vessel and closing the bottom opening. The bottom cap together with the vessel substantially enclosing the liner. The bottom cap includes two lower apertures for aligning with the fluid ports. The bottom cap being formed by two cap portions capable of being separated.

9 Claims, 3 Drawing Sheets

BUBBLE TRAP ASSEMBLY FOR CRITICAL BIOPROCESS APPLICATIONS

CROSS-REFERENCE TO RELATED APPLICATION

The present application claims priority, in part, to provisional patent Application Ser. No. 60/995,951, filed Sep. 29, 2007. This earlier filed provisional application is incorporated herein by reference.

BACKGROUND OF THE INVENTION

In certain processes like a liquid chromatography process used in biopharmaceutical production, it is desirable to remove bubbles or gases held up in a fluid flowing through the process path. Often, such gases get entrained in a fluid stream and should be removed to prevent them from being pumped into a chromatography column. The bubble trap also aids in removal of air initially present in the fluid path. Undesirable gases in the column can disrupt flow patterns, prevent process consistency and effectiveness and cause other problems. A bubble trap is commonly used to systematically remove such gases.

Due to the stringent quality and purity requirements in many biopharmaceutical processes, contemporary bubble traps must be cleaned and/or thoroughly sanitized before they can be reused. Also, due to the high pressures involved in many chromatography processes, the bubble trap vessels must be durable and well constructed, and therefore relatively expensive. It is thus not cost effective to dispose of such expensive vessels after a single or very limited uses.

When a piece of equipment is used for manufacture or development of products and limited equipment downtime is desired, there would be advantages to eliminate the necessity of a cleaning process for the bubble-trap. One way to do this is by having a disposable liner that can meet the requirements of the process. This includes being able to perform at pressure of 8 bar or higher.

It is therefore desirable to provide a bubble trap assembly that can be quickly and easily ready for reuse, while ensuring a clean, sterile or uncontaminated process between uses. Also, such an assembly must also be able to perform under pressures at least as high as 8 bars.

SUMMARY OF THE INVENTION

One aspect of the invention relates to a bubble trap assembly for critical bioprocess applications. The assembly includes a disposable liner for placing in a fluid stream of a critical bioprocess application. The liner includes at least one gas port disposed on a top of the liner, and at least two fluid ports disposed substantially on the bottom of the liner. The fluid ports are adapted to be coupled in-line to the critical bioprocess application. A rigid vessel is included for housing the liner. The liner being sized to substantially conform to a shape of the inside of the vessel. The vessel includes at least one upper aperture for aligning with the at least one gas port and a bottom opening opposed to the at least one upper aperture. A bottom cap is included, removeably secured to the vessel and closing the bottom opening. The bottom cap together with the vessel substantially enclosing the liner. The bottom cap includes at least one lower aperture for aligning with the fluid ports. The bottom cap being formed by at least two cap portions for facilitating installation of the liner in the assembly. The at least two cap portions capable of being separated from one another.

Additionally, the at least one lower aperture can include an inner recess facing the vessel for aligning the fluid ports. The at least one lower aperture can include an outer recess opposed from the inner recess. The at least two cap portions can include mating elements for mutual alignment when assembled. Wherein, at least one of the fluid ports can include a nozzle extending from the bottom of the liner toward the top of the liner. The nozzle can extend toward the top at least beyond a central portion of the liner. The rigid vessel can be formed by at least two separatable portions. Also, the at least two separatable portions can be pivotally hinged to one another. The liner upon installation in the assembly can be capable of withstanding high pressure.

These and other embodiments, features, and advantages of this invention will become apparent from the following detailed description of illustrative embodiments thereof, which is to be read in connection with the accompanying drawings.

BRIEF DESCRIPTION OF THE DRAWINGS

FIG. 2a is a top view of an end cap for a bubble trap assembly in accordance with an embodiment of the subject invention.

FIG. 2b is a cross-sectional view of the end cap of FIG. 2a.

DETAILED DESCRIPTION OF THE PREFERRED EMBODIMENTS

In accordance with an embodiment of the subject invention, a bubble trap assembly is provided that includes a rigid vessel, a removable bottom cap and a disposable inner liner. The assembly is adapted to have the inner liner quickly and easily replaced with a new one for reusing the remaining bubble trap assembly.

In accordance with an embodiment of the invention, a bubble-trap assembly is provided with a disposable liner along with an easy method of installation and removal of the liner from the vessel that forms the bubble trap housing. It should be understood that "disposable" as used throughout this disclosure is intended to mean for a single or limited use.

Figure 1:
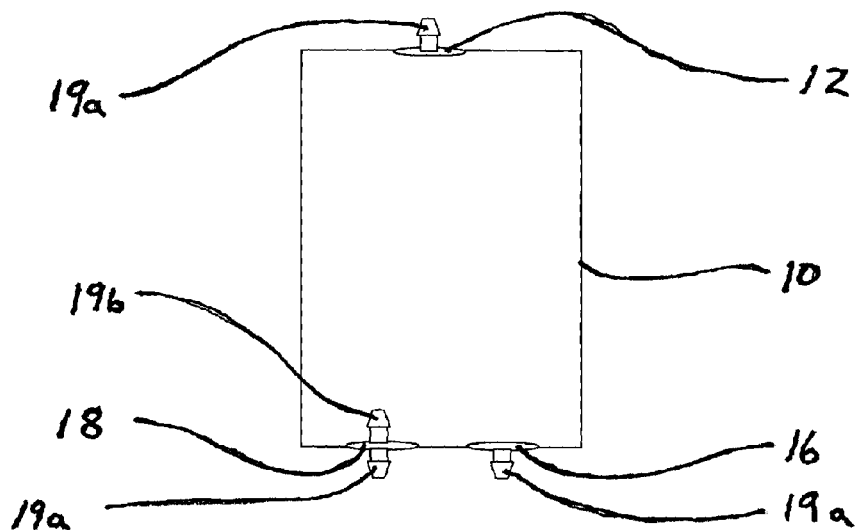
FIG. 1 is a side view of a bubble trap liner in accordance with an embodiment of the subject invention.

As shown in FIG. 1, the liner 10, 10' is preferably similar to a sealed bag with at least one fluid port 18 that acts as a fluid or liquid inlet, one fluid port 16 that acts as a fluid or liquid outlet and at least one gas port 12 that acts as an outlet for air and other gases. The fluid inlet 18 and outlet 16 are on the bottom and the gas outlet 12 on the top. The liner 10, 10' is preferably made of a flexible material the can be made in the shape of a container or expand, preferably without stretching, to take the shape of the container. The liner 10, 10' can be formed from a single ply or multi-ply, using suitable materials as listed in AAMI TIR17: 1997. The liner 10, 10' can be formed as a pillow style bag, having port plates on a face of the liner 10, 10', as opposed to a seam. Alternatively the liner 10, 10' can be formed as a cylinder or almost any desired shape. Preferably the shape of the liner is adapted to conform to that of the vessel 30, 30'.

It should be understood that the term "fluid" as referred to herein includes any flowing or readily moving substance having no fixed shape and yielding its collective form to external pressure. Fluids are not substantially solid or rigid, and include liquids, gases, a combination of liquids and gases, as well as liquids, gases and combinations thereof that include solid particulates or dissolved/disassociated solids. The term "liquid" as referred to herein consists of substances or a combination of substances which flow and take a shape determined by its container while occupying the same volume, rather than dispersing like a gaseous substance. The term "gas" as referred to herein consists of one or more fluids that can change volume indefinitely, such as but not limited to air.

Figure 3:
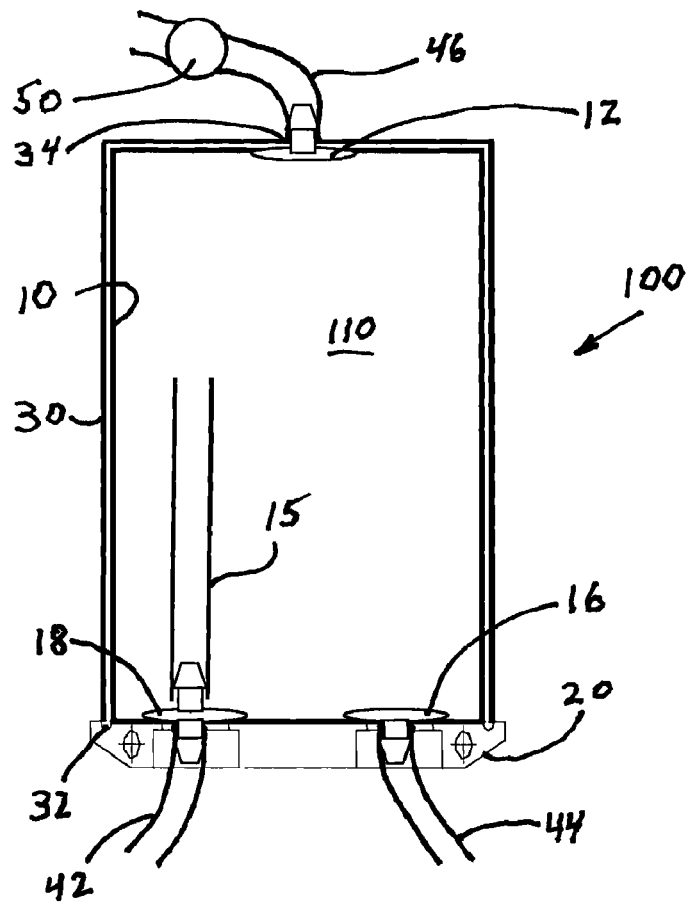
FIG. 3 is a side view of a bubble trap assembly in accordance with an embodiment of the subject invention.
Figure 4:
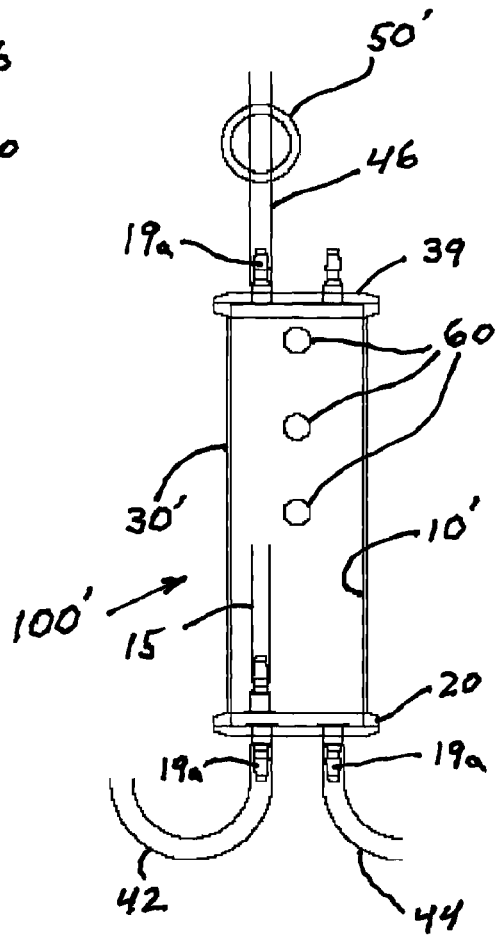
FIG. 4 is a side view of a bubble trap assembly in accordance with another embodiment of the subject invention.

As shown in FIGS. 3 and 4, in preferred embodiments, the liner is placed into a rigid vessel 30, 30' with a removeably secured bottom cap 20. The vessel 30, 30' is preferably a cylindrical member, although other suitable shapes and sizes are contemplated. Preferably, the liner 10, 10' is sized to conform to the shape and size of the vessel 30, 30' either by design or upon expansion with pressure. Alternatively, the top of the vessel could also be removeably secured to the assembly, in the form of a top cap 39 (as shown in FIG. 4). The removable bottom cap 20 allows the liner 10, 10' to be inserted through a bottom opening 32 of the bottom of the vessel 30, 30'. The liner is guided into the vessel 30, 30' towards the top so that the gas outlet 12 aligns with an upper vessel aperture 34 for venting purposes.

When the bubble trap assembly 100, 100' (particularly the liner 10, 10') is being filled with fluid, during a process, gas venting is required to let more fluid enter the inner chamber 110. During installation/assembly, the gas outlet port 12 can be used to add gas, such as air, to inflate the liner 10. Also, pressure can be maintained through the port 12 during process operations, if desirable, but such pressure should be maintained at or below the minimum process pressure.

In a preferred embodiment, ports 12, 16, 18 are formed by an annular port plate that is sealingly secured to the liner 10, 10'. Preferably, a hose barb fitting 19a, 19b or other fitting is integrally formed with the port plate as one molded piece. Thus, a hose or tubing 42, 44, 46 can be secured to the hose barb 19a, 19b. It should be understood, a different hose or tubing connection could be provided in place of the hose barb shown. Also, rather than having a tubing coupling like a hose barb, the tubing could be integrally formed or otherwise permanently fixed to the port plate. Additionally, the gas port 12 can include a bacterial retentive air filter or other type of filter (not shown) to assist in isolating the liner/bubble trap from ambient air. Also, the gas port 12 can be coupled to a valve and/or gauge 50, 50'. The tubing/hose 46 coming off the fitting 19a could be inserted into the valve, like a tubing pinch valve. A valve can vent/release gas from the bubble trap to enable removal of more entrained gas. A pressure gauge could be used to measure pressure in the vent line (after the valve), if positive pressure is being applied via a self relieving style regulator that will relieve gas pressure coming from the bubble trap vent, but it is not necessary to measure the pressure in the bubble trap because in theory it should be the same as the pressure in the fluid path which is either measured at other stages of the fluid flow path within the process or is assumed to be proportional to the pressure generated by any pump within the process (pump pressure less pressure drop due to flow through the process fluid path). Further, such a valve could be a pinch valve that is able to remain closed to keep the tubing closed under the pressure in the system. The valve can be opened manually or by a control system.

In a preferred embodiment, the vessel 30, 30' is made of transparent materials and the liner 10, 10' is also made of transparent materials. In this way, automatic level sensors 60, such as capacitance, ultrasonic or other level sensors, can read liquid level through the vessel 30, 30' and liner 10, 10' to monitor bubble-trap performance and even automatically control a valve for regulating or maintaining volume within the liner while allowing fluids to continue to flow through the assembly. Transparent materials also enable viewing for observation of operation. While the vessel 30, 30', as shown in the drawings is generally cylindrical, it should be understood that the vessel could have another shape or form as desired. The vessel 30, 30' can be made of materials such as glass, plastic, metal or a combination of materials. Additionally, the vessel 30, 30' can include a sight glass or limited portions that are transparaent, as desired. Also, the vessel 30, 30' can have at least one removable end cap 20 to insert the liner or open along a lengthwise parting line. These designs are beneficial because if the liner ports 12, 16, 18 have external tubing or hoses connected to or extending from them, the liner 10, 10' can be inserted in the vessel 30, 30' while maintaining a continuous liquid flow path between the inlet 18 and outlet 16.

The vessel 30, 30' and liner 10, 10' are sized to give the proper residence time based on the process pressure, flow rate and other factors. The volume of the vessel must accommodate enough volume of fluid so that the fluid flowing through the inlet 18 and out of outlet 16 has residence time to allow entrained gases to release into the top of the vessel 30, 30'. The volume of the vessel 30, 30' must also consider the operation pressure because gas initially in the liner at or near atmospheric pressure will be compressed when pressure builds up in the vessel 30, 30' or when the gas expands from process pressure being relieved.

Figure 5:
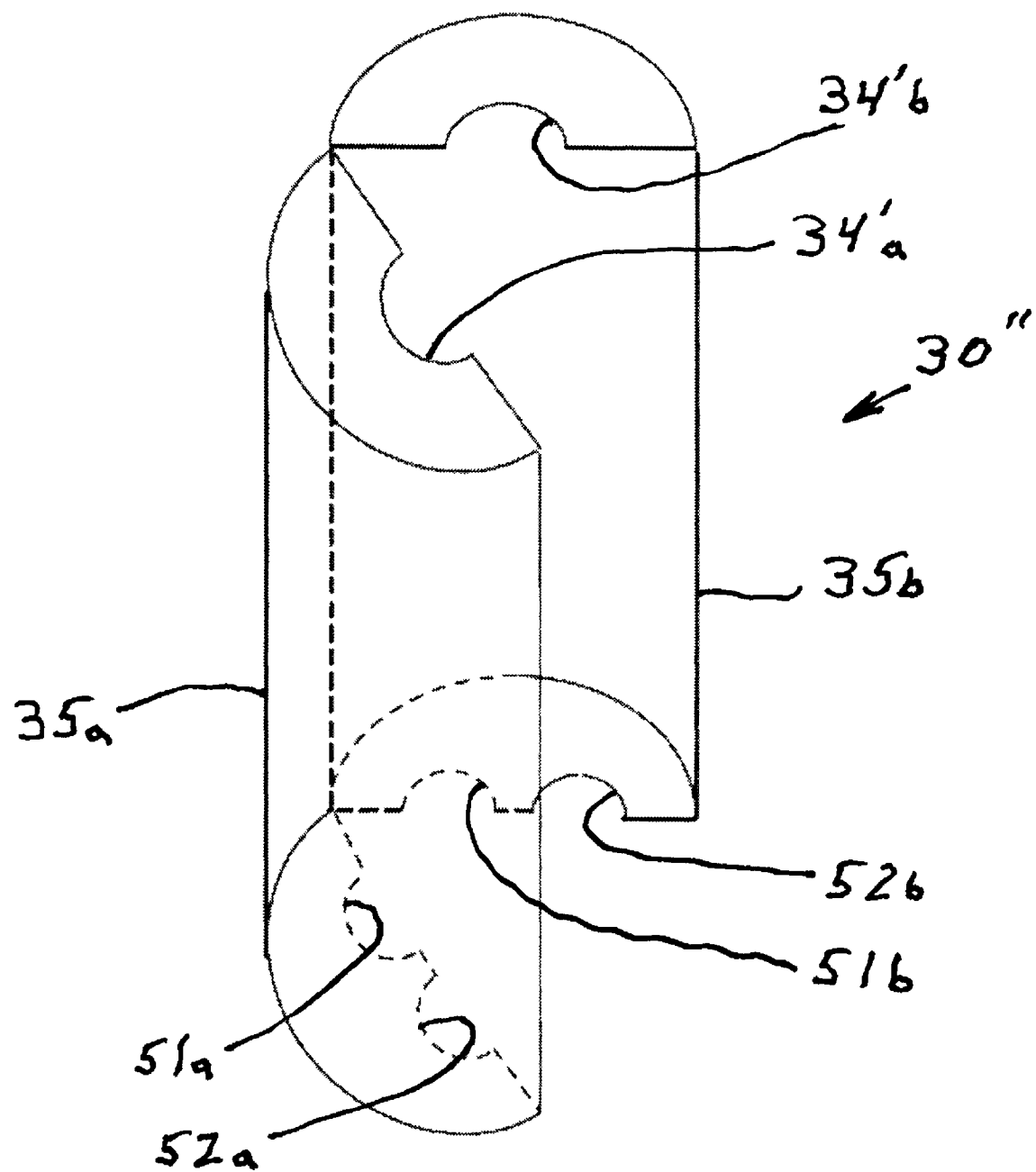
FIG. 5 is a perspective view of a split design vessel in accordance with an embodiment of the subject invention.

Alternatively as shown in FIG. 5, the vessel 30" can be formed to open length-wise (from top to bottom), using clamps or seals (not shown) to maintain the vessel 30" closed and still able to withstand significant pressure levels, such as those above approximately 0.5 bars. Hinges can be provided between the two portions 35a, 35b of the vessel 30" for opening in a clam-shell design. Also, a closure mechanism (not shown) opposed from such hinges could further be provided. However, the two portions 35a, 35b of the vessel 30" need not be permanently attached to one another. Preferably, a split vessel 30" design includes aligning notches or tongue and groove mating elements in the two separate portions 35a, 35b for locating the inlets and outlets in the parting line of the vessel 30, 30'. Such a design can facilitate insertion and alignment of the liner 10, 10' in the vessel 30, 30'.

Additionally, the split vessel 30" can have the bottom cap integrally formed therein. Accordingly, smaller apertures 51a, 51b, 52a, 52b are provided to accommodate the fluid ports 16, 18. Also, at least one upper aperture 34'a, 34'b can be provided to accommodate port 12 in the liner.

The liner 10, 10' can be formed such that when under pressure and not being contained by the vessel 30, 30', it will normally expand and possibly burst. The liner 10, 10' is sized relative to the vessel 30, 30', such that the vessel 30, 30' does not allow the liner 10, 10' to expand to the point rupture or compromising the integrity of the liner 10, 10'. Accordingly, the liner 10, 10' is preferably slightly larger than the vessel 30, 30'. Preferably, the combination of the vessel 30, 30' and liner 10, 10' can withstand relatively high pressure, such as those above approximately 0.5 bars, but preferably at least 8 bars or more.

Figures 2A, 2B:
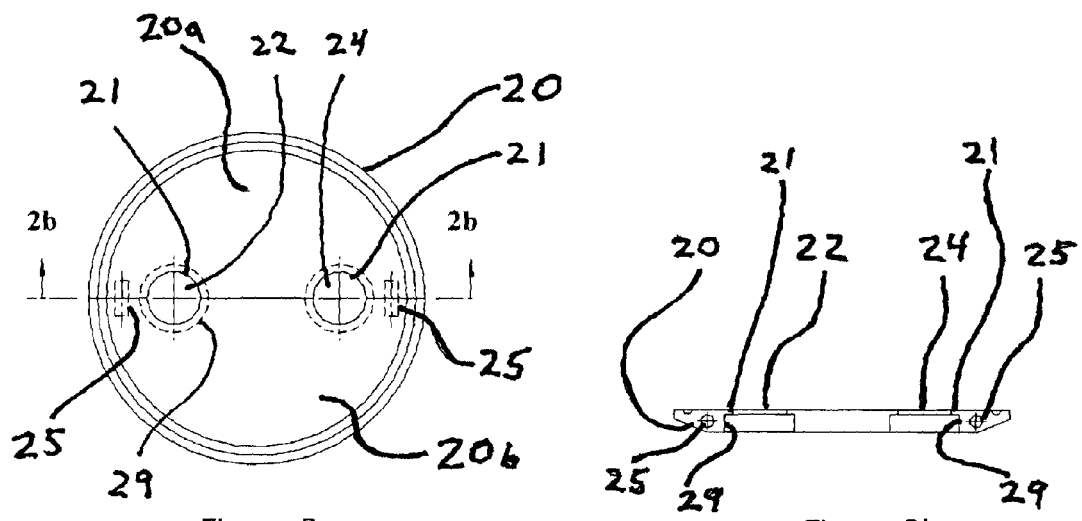

FIGS. 2a and 2b show the removable bottom cap 20. The bottom cap 20 is preferably designed to provide optimal drainage of liquid from the assembly 100. Once the liner 10, 10' is inserted in the vessel 30, 30', the bottom cap 20 is secured to the vessel 30, 30'. Preferably, the liner ports 16, 18 align with at least one aperture 22, 24 in the bottom cap 20.

Thus, the lower liner ports 16, 18 are quickly and easily secured in place by the bottom cap 20.

The bottom cap 20 is preferably formed by two or more parts 20a, 20b that when joined together, along with the vessel 30, 30', enclose the liner 10, 10' inside the assembly 100. Preferably, the bottom cap 20 has notches cut along the parting line of at least one of the end cap pieces that form part of the apertures 22, 24 to allow the tubing to pass. Also, it can have indentations 21 that will allow the inlet 18 and outlet 16 ports (or single port with inlet/outlets) on the liner 10, 10' to seat properly. Preferably, the bottom cap 20 inner surface aperture 22, 24 diameter is formed as small as possible to maintain alignment of the liner 10, 10' and any fittings secured thereto. Additionally, the bottom cap parts 20a, 20b can include mating elements 25, such as mating dowels/recesses, to keep the parts 20a, 20b aligned and stable when assembled on to the end of the vessel 30, 30'. Also, the bottom cap 20 can have cut-outs 29 on the outer surface to allow space for hose clamps or the like that hold hoses on a barb fitting incorporated into the liner ports 12, 16, 18. The bottom cap 20 can be secured to rigid vessel 30, 30' with known methods, such as a clamp/gasket, nuts, bolts, screws or large threaded screws/nuts in order to remain secure at process pressures. The notches 22, 24 in the bottom cap 20 that guide the ports 16, 18 or tubing 42, 44 integral to the liner 10, 10' are sized such that when the assembly 100, and particularly the liner 10, 10', is pressurized they will prevent the ports 16, 18 or integral tubing 42, 44 from bulging past the notches 22, 24.

The ports 12, 16, 18 can be made of materials such as low density polyethylene (LDPE) or high density polyethylene (HDPE) or other desired materials such as those listed in AAMI TIR17: 1997. In a preferred embodiment of the ports 12, 16, 18 have a hose barb 19a external to the liner 10, 10' where tubing or hose 42, 44 can be secured and also can be part of a tubing/manifold assembly designed for single or limited use. Additionally, the fluid inlet 18 can include a further hose barb 19b on the inside of the liner 10, 10' to help direct liquid up and away from the liquid outlet and give the trapped gas time to separate from the liquid. This barb 19b can include an extension 15, extending substantially into the liner. As described above with regard to alternative designs for the ports 12, 16, 18, extension 15 can either be integrally formed with port 18 or a tube or hose could be added, as shown in FIG. 3. Such an extension 15 could potentially extend across the entire length of the liner 10, 10' or even extend to the top of the liner and then bend back toward the bottom of the liner 10, 10'. The liner 10, 10' itself and the ports 12, 16, 18 are preferably optimally designed to prevent dead liquid zones (zones of poor circulation) and promote flow through the ports 12, 16, 18.

While various embodiments of the present invention are specifically illustrated and/or described herein, it will be appreciated that modifications and variations of the present invention may be effected by those skilled in the art without departing from the spirit and intended scope of the invention.

What is claimed is:

1. A bubble trap assembly for critical bioprocess applications, the assembly comprising:
    a disposable liner for placing in a fluid stream of a critical bioprocess application, the liner including at least one gas port disposed on a top of the liner, the liner including at least two fluid ports disposed on the bottom of the liner, the fluid ports adapted to be coupled in-line to the critical bioprocess application;
    a rigid vessel for housing the liner, the liner sized to substantially conform to a shape of the inside of the vessel, the vessel including at least one upper aperture for aligning with the at least one gas port and a bottom opening opposed to the at least one upper aperture; and
    a bottom cap removeably secured to the vessel and closing the bottom opening, the bottom cap together with the vessel substantially enclosing the liner, the bottom cap including at least two lower apertures, each of the lower apertures aligning with a different one of the fluid ports, the bottom cap formed by at least two cap portions for facilitating installation of the liner in the assembly, the at least two cap portions capable of being separated from one another.

2. A bubble trap assembly according to claim 1, wherein each of the at least two lower apertures include an inner recess facing the vessel for aligning the fluid ports.

3. A bubble trap assembly according to claim 2, wherein each of the at least two lower apertures include an outer recess opposed from the inner recess.

4. A bubble trap assembly according to claim 1, wherein the at least two cap portions include mating elements for mutual alignment when assembled.

5. A bubble trap assembly according to claim 1, wherein at least one of the fluid ports includes a nozzle extending from the bottom of the liner toward the top of the liner.

6. A bubble trap assembly according to claim 5, wherein the nozzle extends toward the top at least beyond a central portion of the liner.

7. A bubble trap assembly according to claim 1, wherein the rigid vessel is formed by at least two separatable portions.

8. A bubble trap assembly according to claim 7, wherein the at least two separatable portions are pivotally hinged to one another.

9. A bubble trap assembly according to claim 1, wherein the liner upon installation in the assembly is capable of withstanding pressure above 0.5 bars.

* * * * *